US010610963B2

(12) United States Patent
Colletti et al.

(10) Patent No.: US 10,610,963 B2
(45) Date of Patent: Apr. 7, 2020

(54) SURFACE TREATMENT OF TURBOMACHINERY

(71) Applicant: General Electric Company, Schenectady, NY (US)

(72) Inventors: Andrew Joseph Colletti, Greenville, SC (US); Alexander Regan Fannin, Mauldin, SC (US); Jonathan Matthew Lomas, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 88 days.

(21) Appl. No.: 15/597,430

(22) Filed: May 17, 2017

(65) Prior Publication Data

US 2018/0333804 A1  Nov. 22, 2018

(51) Int. Cl.
*B23K 26/352* (2014.01)
*B23K 26/06* (2014.01)
*B23K 26/0622* (2014.01)
*B23K 26/08* (2014.01)
*B23K 26/361* (2014.01)
(Continued)

(52) U.S. Cl.
CPC ........ *B23K 26/0626* (2013.01); *B08B 7/0042* (2013.01); *B23K 26/0006* (2013.01); *B23K 26/0622* (2015.10); *B23K 26/0823* (2013.01); *B23K 26/0876* (2013.01); *B23K 26/352* (2015.10); *B23K 26/361* (2015.10); *F01D 5/12* (2013.01); *F01D 25/007* (2013.01); *F04D 29/324* (2013.01); *B23K 2101/001* (2018.08); *F05D 2230/72* (2013.01); *F05D 2230/90* (2013.01)

(58) Field of Classification Search
CPC ............ B23K 26/0622; B23K 26/0823; B23K 26/361; B23K 26/0006; B23K 26/0876; B23K 26/352; B23K 2101/001; F01D 5/12; F01D 25/285; F04D 29/324; F05D 2230/90; F05D 2230/72; B08B 7/0042; B23Q 9/00; B23P 2700/01; Y10T 29/49318
See application file for complete search history.

(56) References Cited

U.S. PATENT DOCUMENTS 3,793,698 A   2/1974  Goings
4,368,080 A   1/1983  Langen et al.
(Continued)

FOREIGN PATENT DOCUMENTS

EP   0 933 438 A1   8/1999

OTHER PUBLICATIONS

International Search Report and Written Opinion issued in connection with corresponding PCT Application No. PCT/US2018/032850 dated Sep. 6, 2018.

*Primary Examiner* — Matthew W Jellett
(74) *Attorney, Agent, or Firm* — Hoffman Warnick LLC

(57) ABSTRACT

The present disclosure relates to treating the surface of one or more blade structures. A surface treatment tool according to the disclosure can include a laser emitter configured for substantial perpendicular alignment with a target surface of a blade structure, the blade structure being mounted on a rotor; and a controller communicatively coupled to the laser emitter, wherein the controller adjusts an energy output and a pulse time of the laser emitter to sublimate a contaminant from the target surface of the blade structure.

19 Claims, 5 Drawing Sheets

(51) Int. Cl.
*F04D 29/32* (2006.01)
*F01D 5/12* (2006.01)
*B23K 26/00* (2014.01)
*B08B 7/00* (2006.01)
*F01D 25/00* (2006.01)
*B23K 101/00* (2006.01)

(56) References Cited

U.S. PATENT DOCUMENTS

| | | |
|---|---|---|
| 4,756,765 A | 7/1988 | Woodroffe |
| 5,099,558 A | 3/1992 | Wilson |
| 5,113,582 A | 5/1992 | Monson et al. |
| 5,216,808 A | 6/1993 | Martus et al. |
| 5,328,517 A | 6/1994 | Cates et al. |
| 5,329,684 A | 7/1994 | Budet et al. |
| 5,666,841 A | 9/1997 | Seeger et al. |
| 5,780,806 A | 7/1998 | Ferguson et al. |
| 5,826,453 A | 10/1998 | Prevey, III |
| 6,128,820 A | 10/2000 | Nolan et al. |
| 6,622,570 B1 | 9/2003 | Prevey, III |
| 7,185,521 B2 | 3/2007 | Lombardo et al. |
| 8,628,624 B2 | 1/2014 | Turner et al. |
| 8,713,775 B2 | 5/2014 | Zhang et al. |
| 8,859,935 B2 | 10/2014 | Dunshee |
| 8,900,037 B2 | 12/2014 | Jost |
| 8,927,897 B2 * | 1/2015 | Xu ............ F01D 25/002 219/121.61 |
| 9,061,375 B2 | 6/2015 | Qi et al. |
| 9,085,980 B2 | 7/2015 | Mittendorf et al. |
| 2006/0000814 A1 | 1/2006 | Gu et al. |
| 2008/0262484 A1 | 10/2008 | Hawkins et al. |
| 2012/0102959 A1 * | 5/2012 | Starkweather ............ F23R 3/04 60/752 |
| 2012/0322349 A1 | 12/2012 | Josi |
| 2013/0023279 A1 | 1/2013 | Poon |
| 2013/0232792 A1 | 9/2013 | Quinones et al. |
| 2014/0082939 A1 * | 3/2014 | Hugot ................ F01D 5/005 29/889.1 |
| 2014/0165351 A1 | 6/2014 | Hirano et al. |
| 2015/0047162 A1 | 2/2015 | Huning et al. |
| 2015/0160644 A1 * | 6/2015 | Reid ............ G05B 19/182 700/160 |
| 2016/0083829 A1 * | 3/2016 | Reid ................. C23C 4/02 427/448 |
| 2016/0215362 A1 | 7/2016 | Xue et al. |
| 2017/0028520 A1 * | 2/2017 | Jesu Plu ........... B23Q 9/0007 |
| 2017/0173759 A1 * | 6/2017 | Colletti ............. B23P 15/02 |

* cited by examiner

SURFACE TREATMENT OF TURBOMACHINERY

BACKGROUND

The disclosure relates generally to the treatment of turbomachinery, and more specifically to surface machining tools and methods of treating turbomachine structures (e.g., rotatable blades) with a laser emitter.

Post-deployment treatment of components, such as repair, machining, structural modification, etc. (collectively identified herein as "treatment" or "treatments"), can improve the lifespan and quality of a larger turbomachine assembly without requiring the manufacture of a new, complete assembly and/or individual components thereof. Several components of a turbomachine, such as rotatable wheels adapted to receive blades therein, can engage other components via direct mechanical contact during manufacture and/or operation. Frictional contact between the components can help to maintain a desired mechanical relationship between two or more components, e.g., axially adjacent rotor-mounted wheels of a turbomachine assembly, rotor-mounted compressor or turbine blades, etc.

During the servicing of a gas turbine assembly, a servicer may wish to remove one or more contaminants from the various components thereof. In a conventional treatment process for treating a component, the turbomachine servicer can remove one or more targeted components from the turbomachine to apply one or more surface treatments, e.g., sanding, burnishing, wet grit blasting, detergent washing, dry ice blasting, contact-based machining/blending, and/or other processes. These techniques generally require one or more treating materials to contact exposed surfaces of the component, e.g., to remove contaminants or other undesired materials. Treating a component in this manner can also produce secondary changes to the component structure. Some structural changes to the component may be unanticipated, or difficult to avoid despite further adjusting of the surface treatment machinery. For instance, contact-based surface treatment of turbomachinery may form a recast layer on the surface of the component, e.g., a layer which exhibits increased roughness or reduced material strength. In some cases, improper contact between the component and some treatment materials may contribute to the erosion of a component over time. Even when these effects are negligible, contact-based surface treatments generally require additional time and costs from removing a targeted component from the turbomachine assembly before treatment, and reinstalling the component and/or other components after treatment.

SUMMARY

A first aspect of the disclosure provides a surface treatment tool, including: a laser emitter configured for substantial perpendicular alignment with a target surface of a blade structure, the blade structure being mounted on a rotor; and a controller communicatively coupled to the laser emitter, wherein the controller adjusts an energy output and a pulse time of the laser emitter to sublimate a contaminant from the target surface of the blade structure.

A second aspect of the disclosure provides a surface treatment method, including: rotating a blade structure about a rotor, the blade structure having a target surface with a contaminant thereon; substantially perpendicularly aligning a laser emitter with the target surface, the laser emitter having an adjustable pulse time and an adjustable power output; and pulsing the laser emitter during the rotating of the blade structure about the rotor to sublimate the contaminant from the target surface of the blade structure.

A third aspect of the disclosure provides a surface treatment system, including: a rotor having a plurality of blade structures mounted thereon; a laser emitter configured for substantial perpendicular alignment with a target surface of each of the plurality of blade structures, the laser emitter having an adjustable pulse time and an adjustable power output; and a controller communicatively coupled to the rotor and the laser emitter, the controller being configured to perform actions including: rotating the plurality of blade structures using the rotor, and pulsing the laser emitter during the rotating of the plurality of blade structures to sublimate a contaminant from the target surface of each of the plurality of blade structures.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
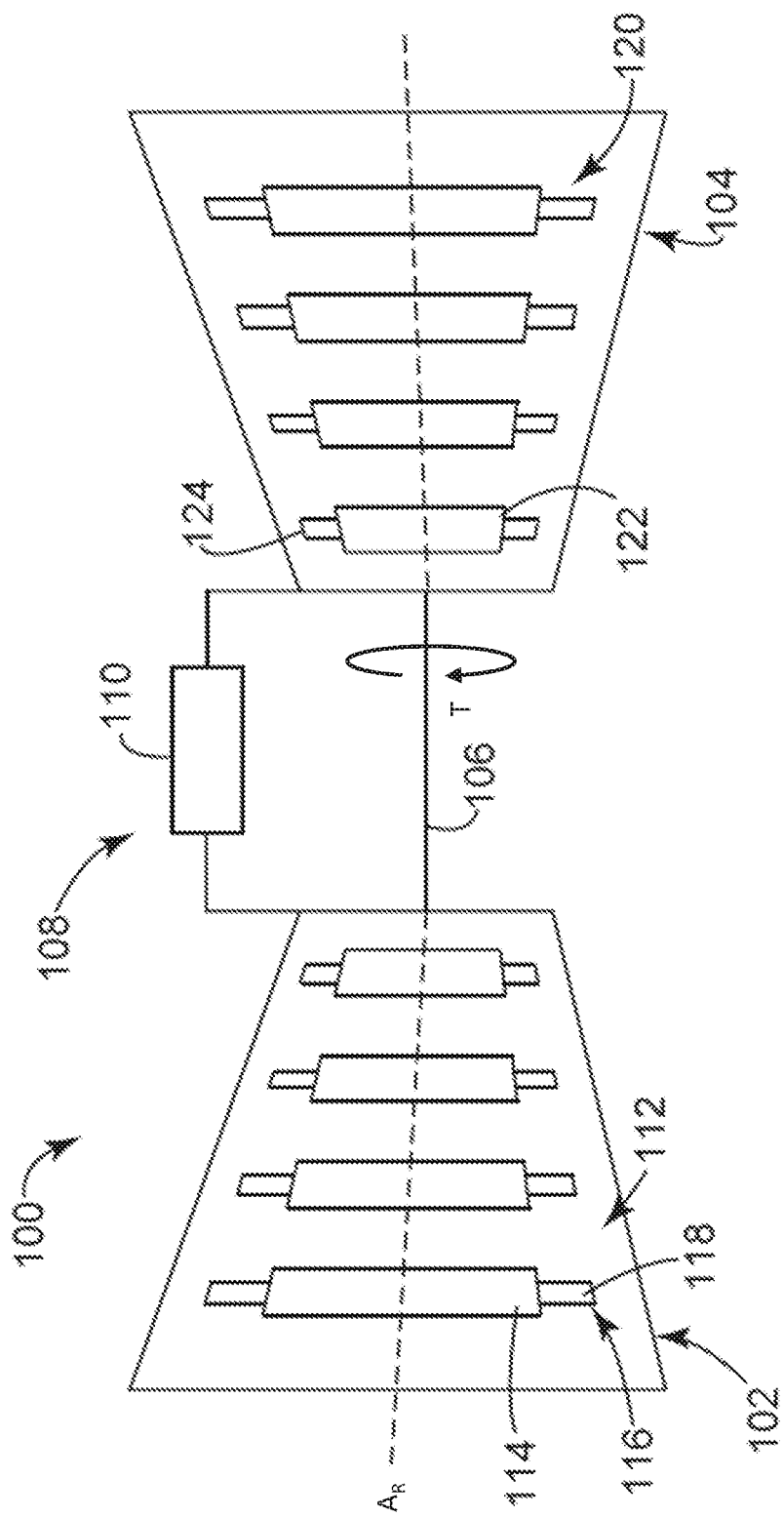
FIG. 1 is a perspective view of a conventional turbomachine system.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be used and that changes may be made without departing from the scope of the present teachings. The following description is, therefore, merely exemplary.

Where an element or layer is referred to as being "on," "engaged to," "disengaged from," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

FIG. 1 shows a conventional turbomachine 100 that includes a compressor portion 102 operatively coupled to a turbine portion 104 through a common compressor/turbine rotor (simply "rotor" hereafter) 106. As used herein, the terms "axial" and/or "axially" refer to the relative position/direction of objects along axis $A_R$, which is substantially parallel with the axis of rotation of the turbomachine (in particular, the rotor section). Additionally, the terms "circumferential" and/or "circumferentially" refer to the relative position/direction of objects along a circumference which surround a particular axis but does not intersect the same axis at any location.

Compressor portion 102 can be fluidically connected to turbine portion 104 through a combustor assembly 108. Combustor assembly 108 includes one or more combustors 110. Combustors 110 may be mounted to turbomachine 100 in a wide range of configurations including, but not limited to, being arranged in a can-annular array. Compressor portion 102 includes a plurality of compressor rotor wheels 112. Rotor wheels 112 include, e.g., first stage compressor rotor wheels 114 (simply "wheels" hereafter) having a plurality of first stage compressor rotor blades 116 each having an associated airfoil portion 118. Similarly, turbine portion 104 includes a plurality of turbine rotor wheels 120 including a first stage turbine wheel 122 having a plurality of first stage turbine rotor blades 124. Various embodiments of the disclosure can apply surface treatments to one or more blades 116, 124, through the use of a surface treatment tool, method, system, etc., as discussed herein. It will be understood, however, that other components of turbomachine 100, and/or similar components within other turbomachine systems, can also be machined with one or more surface treatment tools discussed herein, or otherwise subjected to embodiments of the processes described herein.

Figure 2:
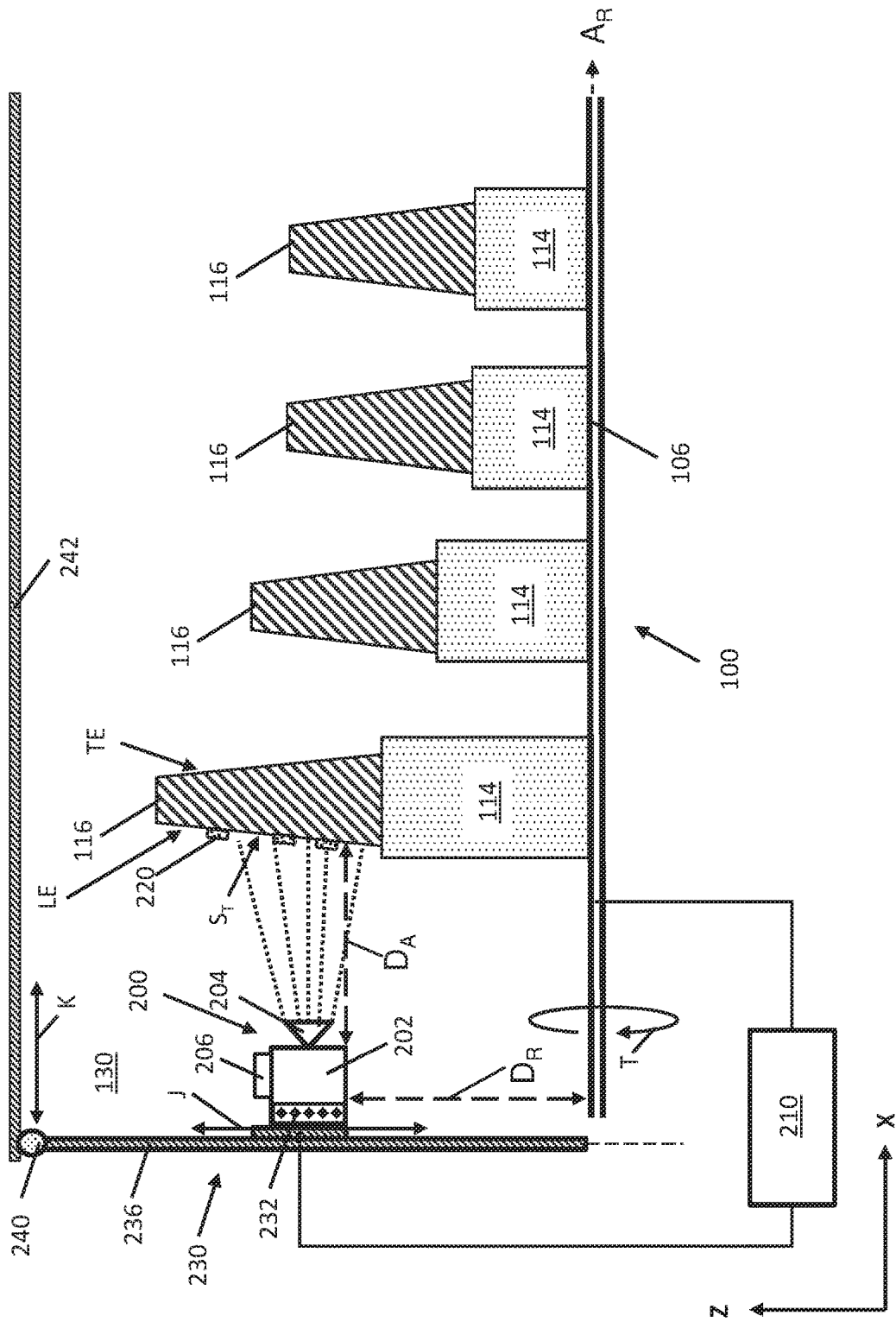
FIG. 2 provides a partial cross-sectional side view of a surface treatment tool and rotor-mounted blades according to embodiments of the present disclosure.

Turning to FIG. 2, a compressor inlet 130 upstream of compressor rotor blades 116 is shown in addition to a surface treatment tool 200 configured for use with turbomachine 100 according to embodiments of the present disclosure. Surface treatment tool 200 is depicted in plane X-Z in FIG. 2 to better illustrate the relative axial and radial positions of various elements described herein. Although surface treatment tool 200 is shown and described herein relative to compressor rotor blades (simply "blades" or "blade structures" hereafter) 116, it is understood that surface treatment tool 200 can also be used with other components of turbomachine 100, e.g., turbine rotor blades 124 (FIG. 1) mounted on rotor 106. In further examples, surface treatment tool 200 can be implemented to remove materials from non-blade components of turbomachine 100, e.g., flanges, mating surfaces, etc., of rotor 106, wheel 114, etc., regardless of whether turbomachine 100 remains assembled or disassembled. Surface treatment tool 200 and elements thereof may be adapted for placement, e.g., within compressor inlet 130 upstream of blades 116, which can remain mounted on rotor 106 through wheel(s) 114. Each blade 116 is shown by example to be mounted on a respective wheel 114 as described elsewhere herein, but it is understood that additional or alternative components, arrangements, etc., for mounting blades 116 relative to rotor 106 are possible. Blades 116 can be adapted to rotate about rotation axis $A_R$, e.g., by corresponding rotation of wheels 114 about rotor 106, e.g., along reference line T.

Surface treatment tool 200 can be configured to remove one or more contaminants from exposed surfaces of blades 116, and without disassembling wheels 114 and/or blades 116 from rotor 106 as described herein. Surface treatment tool 200 can include a laser assembly 202, e.g., for supplying and/or transmitting electrical power to operate various components of surface treatment tool 200. It is also understood that laser assembly 202 may also include and/or be operatively connected to various other components for enabling operation of surface treatment tool 200, e.g., in methods according to the present disclosure. Laser assembly 202 can include or otherwise be connected to a laser emitter 204 configured for substantial alignment with a target surface $S_T$ of blades 116 on wheels 114. The terms "substantial alignment," "substantially aligned," and their equivalents as used in the present disclosure refer to any alignment through which laser emitter is capable of transmitting one or more laser beams onto target surface $S_T$ of blade(s) 116, regardless of variances in the angular orientation of blade(s) 116 and laser emitter 204. Conversely, alignment would not be "substantial" when laser emitter 204 cannot transmit at least one laser onto target surface $S_T$ of blade(s) 116. In an embodiment, laser emitter 204 can be substantially perpendicularly aligned with the planarity of target surface $S_T$ of blade(s) 116, e.g., to emit laser beams onto at least a portion of target surface $S_T$ and remove various materials as described herein.

Laser assembly 202 and laser emitter 204 can be configured to apply surface treatments, e.g., removal of materials, to exposed surfaces of blades 116. Laser assembly 202 may therefore have a higher power consumption and power output as compared to laser assemblies used for different purposes, e.g., laser sensors, lighting lasers, laser scanners, etc. In addition, laser assembly 202 can be distinguished from other laser assemblies by being embodied as a "pulse laser" for alternately emitting laser beams and not emitting laser beams over predetermined intervals. Various components communicatively connected to laser assembly 202, as discussed herein, can vary the pulse time and power output to allow laser assembly 202 to remove various materials from target surface $S_T$ of blade(s) 116 without affecting the underlying material composition of each blade 116. According to an example, laser assembly 202 can include a power source configured to generate laser pulses from laser emitter 204 at an optical power output (simply "power output" hereafter) of, e.g., up to approximately two-hundred millijoules (mJ). In the context of a pulse laser, the laser's power output generally refers to the average amount of energy imparted from the emitted laser beams, including time periods of non-emission. Laser assembly 202 can also be configured to emit lasers at varying intervals, and in an example may be configured to pulse laser beams from emitter 204 at a pulse time of up to approximately one-hundred nanoseconds (ns).

Laser assembly 202 can also include a positional encoder 206. Positional encoder 206 can detect, e.g., the rotational position of rotor 106, wheels 114, and/or blades 116 relative to laser assembly 202. In an embodiment, positional encoder 206 may be mounted on laser assembly 202, but may be structurally integrated with the remainder of laser assembly 202 in alternative embodiments. Positional encoder 206 can be any type of tool or self-contained measuring system, e.g., an angular encoder, capable of deriving the location of an object by reference to a particular point or axis, e.g., on the object or relative to a reference point in the same environment. Positional encoder 206 can operate based on optical, magnetic, capacitive, and/or image based systems for determining an angular position of a targeted object, e.g., blade structures 116 on wheels 114 and rotor 106. Some embodiments of laser assembly 202 can mimic the function of positional encoder 206 by reference to measurements recorded by various sensors over a given time period, e.g., to analytically approximate the position of blades 116 relative to a predetermined speed or velocity profile.

Surface treatment tool 200 can include a controller 210 communicatively coupled to laser emitter 204 of laser assembly 202 to adjust an energy output and/or pulse time of laser beams transmitted to target surface $S_T$ of blade 116. In particular, controller 210 can adjust the energy output and pulse time of laser emitter 204, e.g., such that laser beams emitted from laser emitter 204 will sublimate one or more contaminants 220 residing on target surface $S_T$ of blade 116. Sublimation generally refers to a physical change by which a substance is converted from solid phase to gaseous phase, without first transitioning to liquid phase. The sublimation of contaminants 220 can be provided, e.g., by the transfer of light energy from pulsed lasers to contaminants 220 on blade 116. Such transfer of light energy to contaminants 220 can cause rapid changes in the temperature of solid residue to induce a thermal shock, i.e., sublimation by causing the underlying composition of contaminants 220 to explode. To this extent, contaminants 220 to be removed from blade 116 can include residue from intake air and/or other materials deposited on blade 116 at varying thicknesses, e.g., approximately 0.0025 centimeters (cm) in thickness, materials with a greater thickness, and/or materials with a reduced thickness.

As noted herein, contaminants 220 to be removed from blade 116 can take a variety of forms. Contaminants 220 on blade 116 can include, e.g., rust deposits, oxidation, dust deposits, congealed oil, and/or other substances targeted for removal from blade 116. To provide sufficient energy to sublimate contaminants 220 from blade 116, yet provide a low enough energy to preserve the composition of blade 116, laser emitter 204 can be configured to produce an adjustable laser pulse time and/or energy output. In an example, controller 210 can set the power output and pulse time from laser assembly 202 to be less than their maximum values. For example, controller 210 can set the average power output from laser emitter 204 to, e.g., up to approximately one-hundred mJ. In a further example, controller 210 can similarly set the maximum pulsing time (e.g., time between the beginning of one pulse and the beginning of the next pulse) from laser emitter 204 to be up to approximately fifty ns. In any case, controller 210 can modify the power output, pulse time, and/or other characteristics of laser beams from laser emitter 204 to accommodate various settings or applications (e.g., different forms of blades 116 and/or contaminants 220). Controller 210 can select a pulse time and/or power output from laser emitter 204 such that contaminants 220 are sublimated from blade 116 without affecting the structural composition of blade 116. In particular, controller 210 can adjust laser emitter 204 to avoid forming a recast layer on blade 116 after contaminants 220 have been removed.

Figure 3:
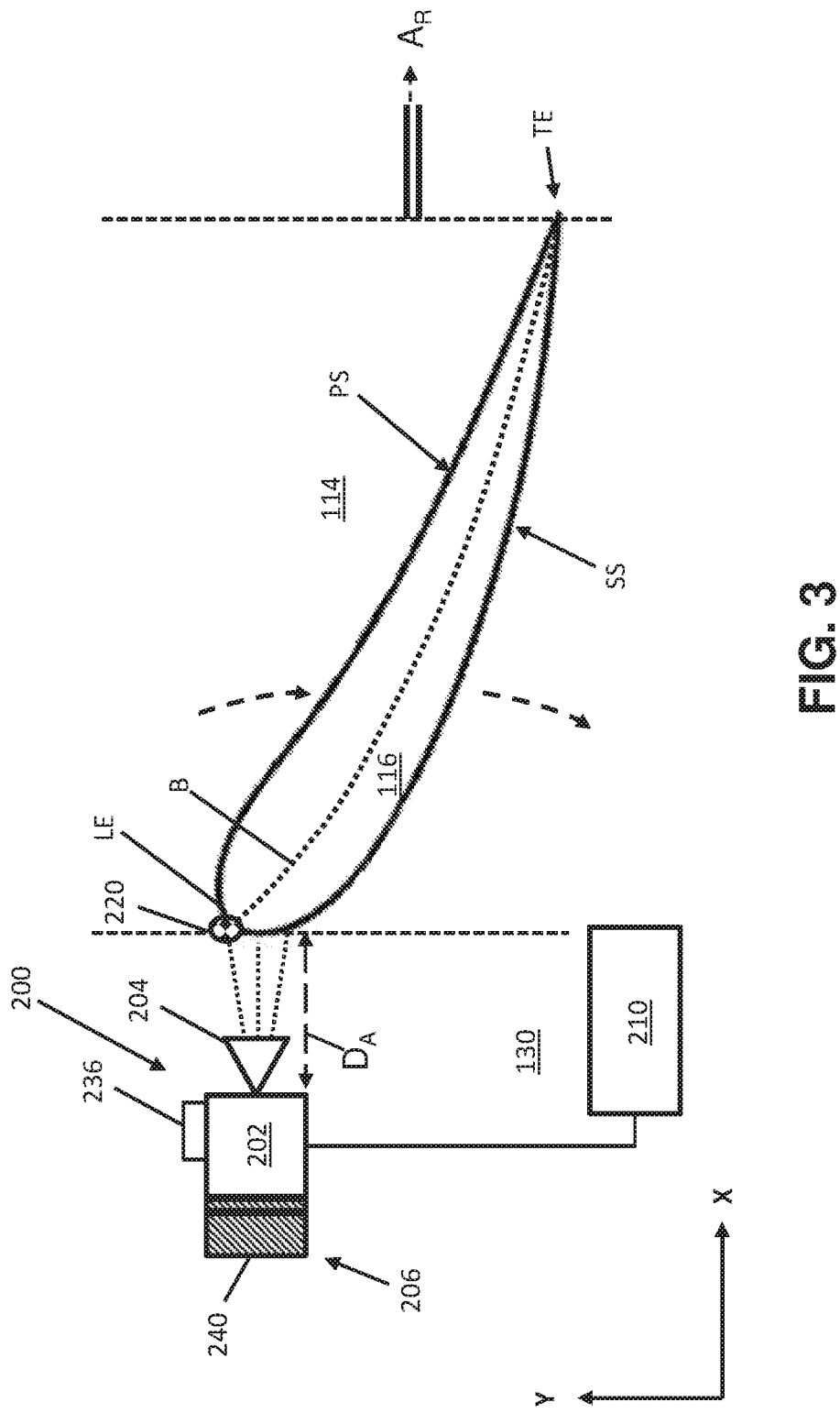
FIG. 3 provides a partial cross-sectional plan view of a surface treatment tool and blade profile according to embodiments of the present disclosure.

Referring to FIGS. 2 and 3 together, surface treatment tool 200 can be configured to remove contaminants 220 from specific target surfaces $S_T$ of blade 116. A profile of blade 116 is shown in plane X-Y in FIG. 3 to better illustrate the position of laser assembly 202 relative to blade 116 in an example embodiment. An example path by which blade 116 rotates about rotation axis $A_R$ is shown with phantom lines in FIG. 3. As shown, blade 116 can include a leading edge LE positioned at an initial point of contact between an operative fluid of turbomachine 100 and blade 116. A trailing edge TE, by contrast, can be positioned on blade 116 oppose leading edge LE. In addition, blade 116 can include a pressure side surface PS and/or suction side surface SS distinguished by a transverse line B which substantially bisects leading edge LE and extends to the apex of trailing edge TE. Pressure side surface PS and suction side surface SS can be distinguished from each other based on whether, during operation, fluids flowing past blade 116 exert positive or negative resultant pressures against respective surfaces against blade 116. In the example embodiment of FIG. 3, pressure side surface PS can have a substantially concave surface profile while suction side surface SS can have a substantially convex surface profile. As shown, target surface $S_T$ can include all or a portion of leading edge LE of blade 116, e.g., to remove contaminants 220 deposited on blades 116 by a fluid flow through inlet 130.

Figure 4:
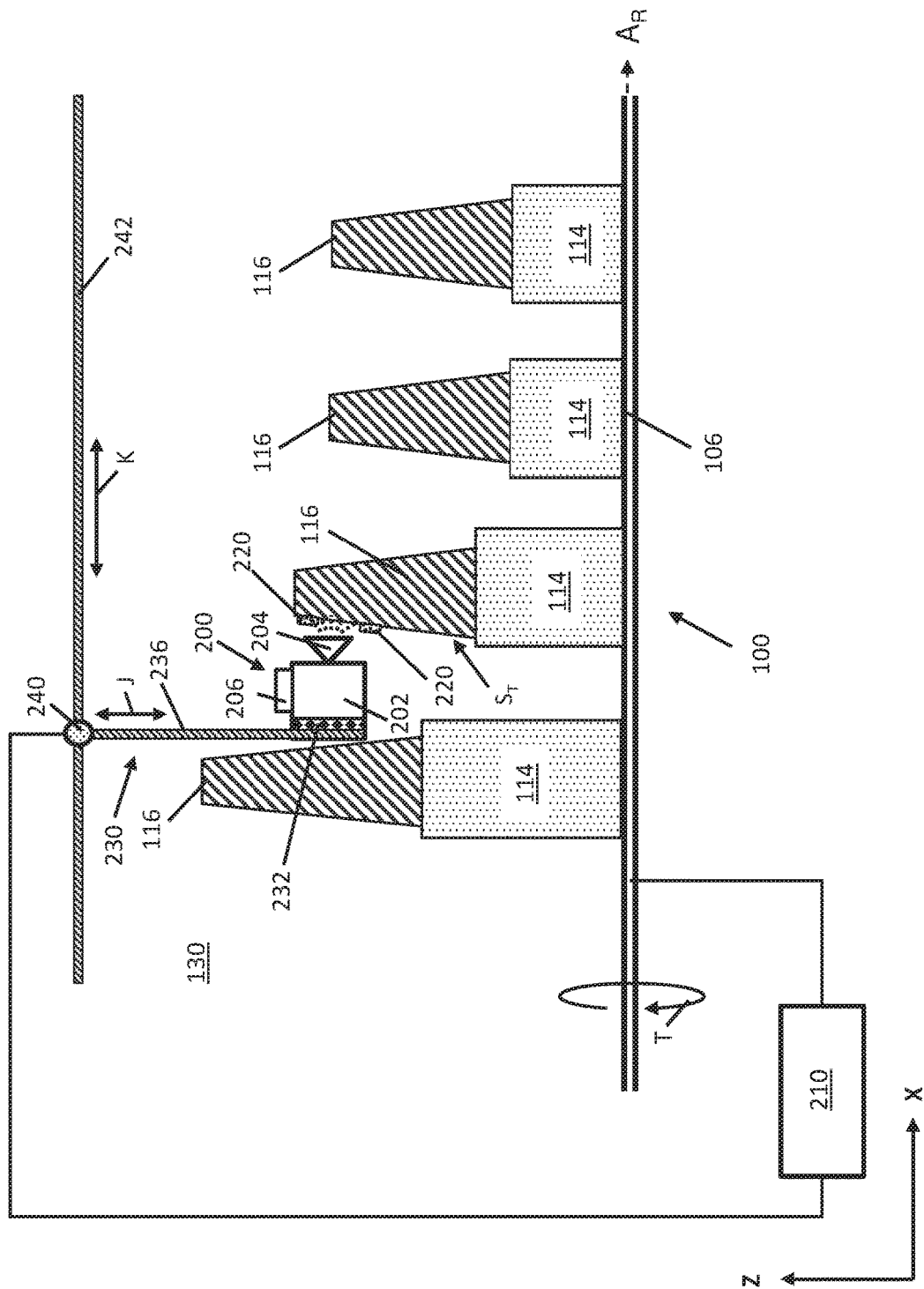
FIG. 4 provides a partial cross-sectional side view of a surface treatment tool positioned between rotor-mounted blades according to embodiments of the present disclosure.

Referring to FIGS. 2 and 4 together, surface treatment tool 200 can include features for treating multiple blades 116 and/or other parts of turbomachine 100. As shown, laser assembly 202 can be mounted on an actuator assembly 230 for substantially aligning laser emitter 204 of surface treatment tool 200 with various blades 116 and/or portions thereof. Actuator assembly 230 can be adapted such that surface treatment tool 200 is movable to different positions relative to turbomachine 100 without removing wheels 114 and/or blades 116 from rotor 106. During operation, an operator of surface treatment tool 200 can adjust the position of laser assembly 202 with actuator assembly 230. Actuator assembly 230 can be adapted to selectively hold laser assembly 202 in a fixed position, e.g., in substantial alignment with target surface $S_T$ of blade(s) 116. While laser emitter 204 emits laser beams onto blade(s) 116 in a fixed position, controller 210 and/or an operator of surface treatment tool 200 can rotate wheels 114 and blades 116 about rotor 106. Surface treatment tool 200 can thereby remove contaminants 220 from multiple blades 116 mounted on rotor 106 while remaining in the fixed position. After treating target surfaces $S_T$ of blade(s) 116 in a single stage, an operator of surface treatment tool can move laser assembly 202 to another axial position (e.g., by adjusting actuator assembly 230) to treat blades 116 in another stage of turbomachine 100. Surface treatment tool 200 is therefore operable to treat blades 116 at multiple stages within compressor inlet 130 without removing wheels 114 and/or blades 116 from turbomachine 100. Various features of actuator assembly 230 are described herein.

Actuator 232 (visible in FIG. 2 only) of actuator assembly 230 can be mechanically coupled to laser assembly 202 to permit positional adjusting of laser assembly 202, laser emitter 204, and/or other tools included in surface treatment tool 200, relative to turbomachine 100 and/or blade(s) 116. Actuator 232 can be provided as any currently-known or later developed device for providing an adjustable length dimension and/or adjustable position when included as part of a structural component. For example, actuator 232 can be embodied as one or more of, e.g., a linear actuator, a piezoelectric actuator, a pneumatic actuator, a servo actuator, a nano actuator, a hydraulic actuator, a motor-driven actuator, and/or any other currently known or later-developed mechanism for manipulating the position of one element relative to another. Actuator 232 can be structured to move along a radial member 236 positioned within inlet 130. Radial member 236 can be embodied, e.g., as a rigid element extending inwardly through inlet 130, with laser assembly 202 being slidably connected thereto through one or more bearings for providing translational movement. The coupling between radial member 236 and actuator 232 can be provided as, e.g., a rolling bearing, a worm gear, a rack and pinion, a sliding and mating engagement, a magnetic or magnetic/mechanical engagement, etc. Actuator 232 and/or radial member 236 can include mechanical latches, stops, and similar structures configured to interconnect with laser assembly 202, allowing or prohibiting movement of laser assembly 202 in a substantially radial direction, e.g., substantially along the direction of arrow J. In other embodiments, radial member 236 may itself take the form of a non-fixed or adjustable-length member (e.g., an additional actuator) configured to extent and retract and thus manipulate the position of laser assembly 202 within inlet 130. It is understood that actuator 232 can, where applicable, also include one or more drive systems (e.g., batteries and/or other power sources) for instantiating movement along one or more directions as described herein. In this case, an operator may further control the position of laser assembly 202 relative to blade 116 with additional components included within and/or operably connected to actuator 232. For example, actuator 232 can include or otherwise be connected to a mechanical motor, electrical motor, etc., for producing and transmitting mechanical work to actuator 232 to move laser assembly 202 within inlet 130, e.g., along radial member 236.

At various positions, laser assembly 202 can be separated from rotor 106 from a radial separation distance $D_R$, e.g., due to being positioned on radial member 236 of actuator assembly 230. Actuator assembly 230 can permit movement of laser assembly 202 to different positions with corresponding radial separation distances $D_R$. During operation, controller 210 and/or an operator of surface treatment tool 200 can adjust actuator 232 to change the position of laser assembly 202 relative to rotor 106, thereby adjusting the size of radial separation distance $D_R$ between rotor 106 and surface treatment tool 200. The position of laser assembly 202 on radial member 236 can directly correspond to radial separation distance $D_R$, e.g., by radial member 236 being oriented substantially outward from rotor 106. Adjusting the position of laser assembly 202 on radial member 236 can also affect, e.g., an axial separation distance $D_A$ between blade 116 and laser assembly 202. In embodiments where target surface $S_T$ has a different angular orientation from radial member 236, adjusting actuator 232 can also affect the axial displacement between blade 116 and laser assembly 202. To this extent, an operator of surface treatment tool 200 can move laser assembly 202 closer to target surface $S_T$ by moving laser assembly 202 to a different position of radial member 236. As a result, surface treatment tool 200 and components thereof can selectively move, e.g., substantially radially toward or away from rotor 106. Surface treatment tool 200 can thus move freely during its operation, e.g., manually or with the aid of other tools included within and/or external to actuator assembly 230. For example, actuator 232 can include an actuation system therein (operated, e.g., by electrical power, hydraulic fluids, etc.) for moving laser assembly 202 within inlet 130, e.g., along radial member 236. Actuator 232 can thus allow laser emitter 204 to be brought into or out of substantial alignment with various locations on target surface $S_T$, e.g., to sublimate contaminants 220 at various locations on blade 116.

Actuator assembly 230 can also be configured to axially move laser assembly 202 and/or laser emitter 204 relative to blade(s) 116. Actuator assembly 230 can include, e.g., a secondary actuator 240 slidably coupling radial member 236 to an axial member 242 extending substantially in parallel with rotor 106 and axis of rotation $A_R$. Secondary actuator 240 may include one or more of the example mechanical actuators described herein with respect to actuator 232, and/or may include any other currently known or later-developed device for mechanically actuating one component with respect to another. Secondary actuator 240 can be configured to move axially relative to radial member 236, e.g., substantially along the direction of reference arrow K to substantially align laser assembly 202 with various blades 116 mounted on wheels 114 and rotor 106. As noted elsewhere herein, radial member 236 can have an adjustable length (e.g., by including one or more embedded actuators and/or similar devices) in some embodiments. To move surface treatment tool 200 to various stages of inlet 130, an operator can adjust actuator assembly 230 and/or radial member 236 to move laser assembly 202 radially outward from blades 116. Secondary actuator 240 can then move laser assembly 202 axially along axial member 242 to a successive stage of blades 116. Afterward, controller 210 or an operator of surface treatment tool 200 can move laser assembly 202 radially toward rotor 106 and into substantial alignment with another target surface $S_T$ of blades 116. As shown in FIGS. 2 and 4, laser assembly 202 can initially treat one blade 116 position, e.g., in an upstream portion of inlet 130 before actuators 232, 240 adjust the position of laser assembly 202 to remove contaminants 220 from other blades 116. Actuators 232, 240 together can allow an operator of surface treatment tool 200 to remove contaminants 220 from blades 116 of turbomachine 100 in situ, e.g., by sublimating contaminants 220 from rotating blades 116 at successive locations without removing wheels 114 and/or blades 116 from rotor 106.

Figure 5:
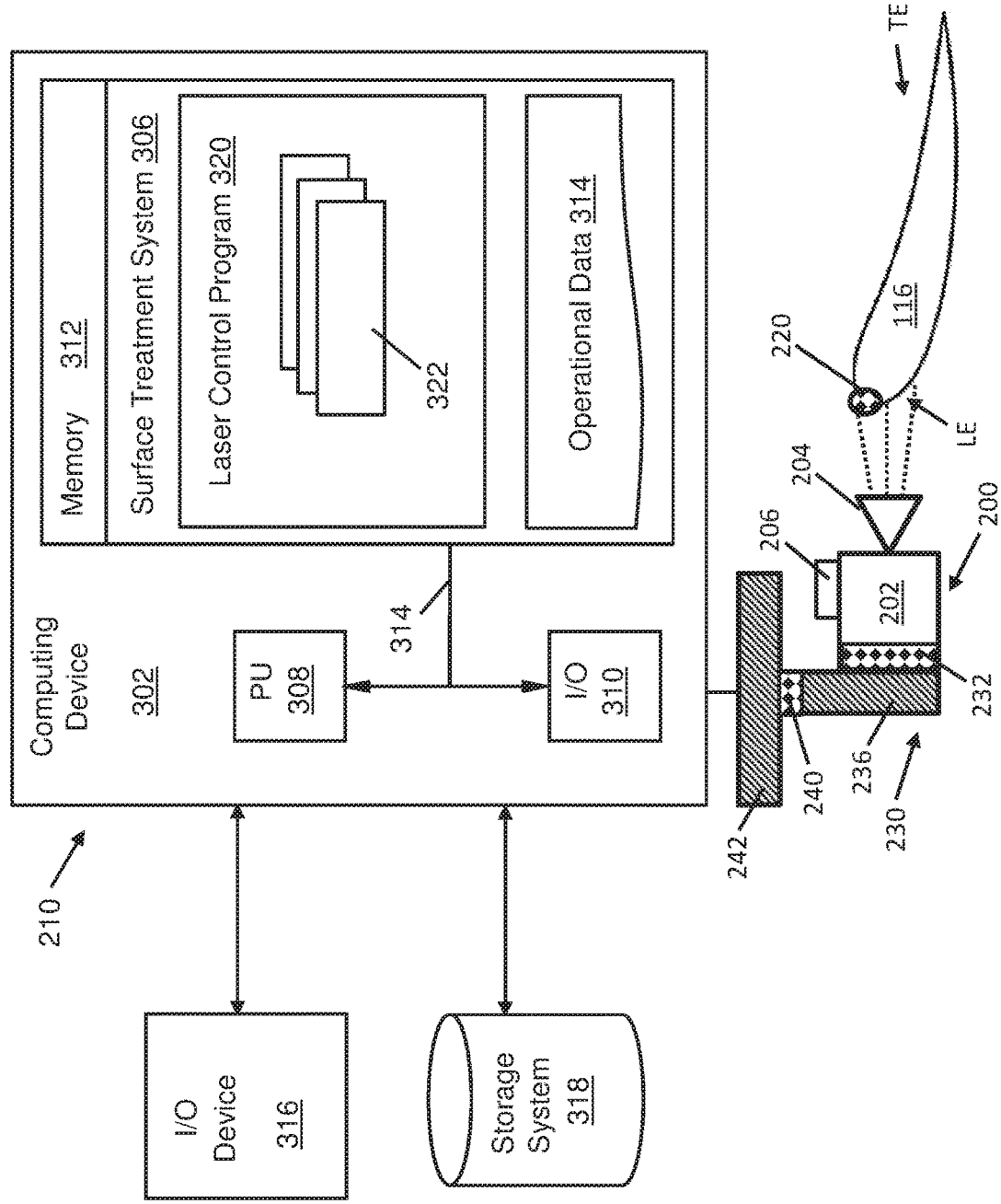
FIG. 5 provides a schematic view of a controller for a surface treatment tool according to embodiments of the present disclosure.

Referring to FIGS. 2 and 5, further subcomponents of controller 210 are shown to illustrate further embodiments of the disclosure. Various components of controller 210 for controlling surface treatment tool 200, including laser assembly 202 and actuator assembly 230, to sublimate contaminants 220 from blades 116 are shown and described relative to FIG. 5. Controller 210 is shown to include a computing device 302 for providing a surface treatment system 306, which makes controller 210 operable to direct and operate surface treatment tool 200 and associated systems and tools described herein and implement any/all of the embodiments described herein. In operation, computing device 302 of controller 210 can issue electrical commands, which in turn may be converted into mechanical actions (e.g., emitting a laser from laser emitter 204, movement of actuator(s) 232, 240, etc.) in response to particular conditions. The conditions for emitting laser beams from laser emitter 204 and/or adjusting actuator assembly 230 can include, e.g., a rotational position of blade(s) 116 measured with positional encoder 206, an elapsed pulse time or inter-pulse time, a signal that contaminants 220 have been at least partially removed from blade 116.

Controller 210 is shown including a processing component (PU) 308 (e.g., one or more processors), an input/output (I/O) component 310 (e.g., one or more I/O interfaces and/or devices), a memory 312 (e.g., a storage hierarchy), and a communications pathway 314. Further, computing device 302 is shown in communication with an external I/O device 316 and a storage system 318. In general, processing component 308 executes program code, such as surface treatment system 306, which is at least partially fixed in memory 312. While executing program code, processing component 308 can process data, which can result in reading and/or writing transformed data from/to memory 312 and/or I/O component 310 for further processing. Pathway 314 provides a communications link between each of the components in controller 210. I/O component 310 can comprise one or more human I/O devices, which enable an operator (i.e., a human or machine) to interact with controller 210 and/or one or more communications devices to enable such operators to communicate with controller 210 using any type of communications link. To this extent, surface treatment system 306 can manage a set of interfaces (e.g., graphical user interface(s), application program interface, etc.) that enable operators to interact with surface treatment system 306. Further, surface treatment system 306 can manage (e.g., store, retrieve, create, manipulate, organize, present, etc.) data, such operational data received from and/or pertaining to turbomachine 100, surface treatment tool 200 (including measured or recorded positions, pulse times, energy outputs, etc.) using any solution.

In any event, controller 210 can comprise one or more general-purpose or specific-purpose computing articles of manufacture (e.g., computing devices) capable of executing program code, such as surface treatment system 306, installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c) decompression. To this extent, surface treatment system 306 can be embodied as any combination of system software and/or application software.

Surface treatment system 306 can execute a laser control program 320, which in turn can include various software modules 322 configured to perform different actions. In this case, modules 322 can enable controller 210 to perform a set of tasks used by surface treatment system 306, and in some cases can be separately developed and/or implemented apart from other portions of surface treatment system 306. Modules 322 can also be configured to display (e.g., via graphics, text, and/or combinations thereof) a particular user interface on I/O device(s) 316, e.g., a display. When fixed in memory 312 of controller 210 that includes PU 308, modules 322 represent a substantial portion of a component that implements the functionality. Regardless, it is understood that two or more components, modules and/or systems may share some/all of their respective hardware and/or software. Further, it is understood that some of the functionality discussed herein may not be implemented or additional functionality may be included as part of controller 210. The various modules 322 of laser control program 320 can use algorithm-based calculations, look up tables, and similar tools stored in memory 312 for processing, analyzing, and operating on data to perform their respective functions. In general, PU 308 can execute computer program code to run software, such as surface treatment system 306, which can be stored in memory 312 and/or storage system 318. While executing computer program code, PU 308 can read and/or write data to or from memory 312, storage system 318, and/or I/O component 310.

During operation, controller 210 and/or an operator of turbomachine 100 and surface treatment tool 200 can implement methods according to the disclosure to treat surfaces (e.g., target surface $S_T$) of blades 116 positioned, e.g., within compressor inlet 130 of turbomachine 100. In an embodiment, methods according to the disclosure can include rotating wheels 114 and blades 116, with contaminant(s) 220 thereon, about rotor 106 (e.g., along reference line T). Controller 210 and/or an operator of surface treatment tool 200 can substantially align laser emitter 204 of surface treatment tool 200 with target surface $S_T$ of blade 116, e.g., at a selected axial displacement $D_A$ from blade 116 and radial displacement $D_R$ from shaft 106. Methods according to the disclosure can include adjusting displacements $D_A$, $D_R$, with actuator assembly 230 as described herein. Controller 210 and/or an operator of surface treatment tool 200 can then pulse laser emitter 204 at a predetermined pulse time (e.g., up to approximately fifty ns as discussed herein) at a desired power output (e.g., up to approximately one-hundred mJ) to sublimate contaminants 220 from blade 116. The sublimation of contaminants 220 can be enabled or improved, e.g., by actively adjusting the pulse time and energy output from laser emitter 204 wheels 114 and blades 116 rotate on rotor 106. The power output and pulse time of laser emitter 204 can be predetermined to sublimate contaminants 220 from blade 116 without modifying the underlying material composition of target surface $T_S$, e.g., to prevent mechanical wear on turbomachine 100 and/or the forming of a recast layer on target surface $T_S$ of blade 116.

According to further embodiments, surface treatment system 306 of controller 210 can allow surface treatment tool 200 to automatically treat multiple stages of blades 116 within inlet 130. In one example, laser assembly 202 can remain in a fixed position as laser emitter 204 sublimates contaminants 220 from multiple blades 116. The various blades 116 in one position can rotate about rotor 106 while laser assembly 202 remains stationary, and positional encoder 206 automatically calculates, determines, etc., a number of blades treated by laser assembly 202 at the fixed position. Operation of laser assembly 202 can temporarily cease once a predetermined number of blades have been treated. After laser assembly 202 treats a predetermined number of blades 116 with laser emitter 204, surface treatment system 306 can also instruct actuator assembly 230 to radially move laser assembly 202 out from the current stage of blades. Thereafter, surface treatment system 306 can axially and/or radially move laser assembly 202 into another stage of inlet 130, e.g., by manipulation of axial and radial members 236, 242 as described elsewhere herein. Surface treatment system 306 can then instruct laser assembly 202 to resume treatment of blades 116, e.g., by causing laser emitter 204 to emit laser beams at a predetermined power output and/or pulse time to sublimate contaminants 220 from additional blades 116. It is understood that in an additional or alternative embodiment, surface treatment system 306 can move laser assembly 202 into substantial alignment with blades 116 of other turbomachines 100, rotors 106, etc., in a shared space to apply surface treatments to multiple power generation systems in a brief timespan.

When controller 210 comprises multiple computing devices, each computing device 302 may have only a portion of surface treatment system 306 or laser control program 320 fixed thereon (e.g., one or more modules 322). However, it is understood that controller 210 and surface treatment system 306 are only representative of various possible equivalent computer systems that may perform a process described herein. To this extent, in other embodiments, the functionality provided by controller 210 and surface treatment system 306 can be at least partially implemented by one or more computing devices 302 that include any combination of general and/or specific purpose hardware with or without program code. In each embodiment, the hardware and program code, if included, can be created using standard engineering and programming techniques, respectively.

Regardless, when controller 210 includes multiple computing devices 302, computing devices 302 can communicate over any type of communications link. Further, while performing a process described herein, controller 210 can communicate with one or more other computer systems using any type of communications link. In either case, the communications link can comprise any combination of various types of wired and/or wireless links; comprise any combination of one or more types of networks; and/or use any combination of various types of transmission techniques and protocols.

It is understood that aspects of the invention further provide various alternative embodiments. For example, in one embodiment, the present disclosure provides controller 210 for automatically adjusting pulsing lasers from laser assembly 202 to sublimate contaminants 220 from blades 116, counting (e.g., with positional encoder 206) the number of blades 116 treated with surface treatment tool 200, and/or automatically adjusting the position of surface treatment tool 200 with actuator assembly 230 to remove further contaminants 220 or treat other blades 116. Further embodiments can include, e.g., operating surface treatment tool 200 and/or controller 210 manually (e.g., by a technician) or by the intervention of one or more computer systems operatively connected thereto. It is understood that controller 210 may be adapted to serve technical purposes in other settings beyond servicing of turbomachine 100, including without limitation: inspection, testing, general operation, etc.

Surface treatment system 306 and/or laser control program 320 can be in the form of a computer program fixed in at least one computer-readable medium, which when executed, enables controller 210 to operate surface treatment tool 200 and/or any components included therein or connected thereto (e.g., laser assembly 202 and/or actuator assembly 230). To this extent, the computer-readable medium includes program code which implements some or all of the processes and/or embodiments described herein. It is understood that the term "computer-readable medium" comprises one or more of any type of tangible medium of expression, now known or later developed, from which a copy of the program code can be perceived, reproduced or otherwise communicated by a computing device. For example, the computer-readable medium can comprise: one or more portable storage articles of manufacture; one or more memory/storage components of a computing device; paper; etc.

Embodiments of the present disclosure can provide several technical effects and commercial advantages, some of which are described by way of example. Various embodiments of surface treatment tool 200 can allow the operator and/or servicer of turbomachine 100 to quickly and effectively remove various types of contaminants without disassembling wheels 114 and/or blades 116, e.g., within inlet 130 to compressor 102 (FIG. 1). Although conventional solutions may also be capable of removing contaminants 220 from blades 116, such solutions require contact-based mechanisms and components which may affect the material composition of blades 116. In particular, contact-based surface treatment of blades 116 can yield a recast layer on blades 116 with altered material properties, e.g., reduced material strength or useful lifespan. Embodiments of surface treatment tool 200, by contrast, can remove contaminants 220 without physically contacting blades 116, and controller 210 can control the pulse time and power output of light emitted from laser assembly 204 to substantially maintain the material composition of blades 116. Surface treatment tool 200 can thus extend the lifespan of blades 116 of turbomachine 100 and/or yield improved operating characteristics after servicing.

The apparatus and method of the present disclosure is not limited to any one particular gas turbine, combustion system, internal combustion engine, power generation system or other system, and may be used with other power generation systems and/or systems (e.g., combined cycle, simple cycle, nuclear reactor, etc.). Additionally, the apparatus of the present invention may be used with other systems not described herein that may benefit from the increased operational range, efficiency, durability and reliability of the apparatus described herein.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A surface treatment tool comprising:
    a laser emitter configured for substantial perpendicular alignment with a target surface of a blade structure, the blade structure being mounted on a rotor, and wherein the laser emitter is mechanically coupled onto an actuator assembly including a first member extending radially with respect to a centerline axis of the rotor and a second member extending axially in parallel with the centerline axis of the rotor, such that a position of the laser emitter relative to the blade structure is adjustable along an axial direction of the rotor or a radial direction from the rotor;
    a controller communicatively coupled to the laser emitter, the actuator assembly, and the rotor, wherein the controller adjusts the position of the laser emitter on the actuator assembly, a rotational position of the blade structure via the rotor, an energy output from the laser emitter, and a pulse time of the laser emitter to sublimate a contaminant from the target surface of the blade structure; and
    a positional encoder in communication with the controller, mounted on the laser assembly, and configured to detect a rotational position of the blade structure relative to the laser assembly, wherein the controller is further configured to adjust the energy output and the pulse time of the laser emitter, based on the rotational position of the blade structure, to sublimate the contaminant without modifying a material composition of the target surface of the blade structure.

2. The surface treatment tool of claim 1, wherein a maximum energy output from the laser emitter is approximately one-hundred millijoules (mJ).

3. The surface treatment tool of claim 1, wherein a maximum pulse time of the laser emitter is approximately fifty nanoseconds (ns).

4. The surface treatment tool of claim 1, wherein the blade structure comprises a compressor blade, and wherein the target surface comprises a leading edge surface, a trailing edge surface, a pressure side surface, or a suction side surface of the compressor blade.

5. The surface treatment tool of claim 1, wherein the contaminant comprises one of an inorganic compound or an oxide compound.

6. A surface treatment method, comprising:
rotating a blade structure about a rotor, the blade structure having a target surface with a contaminant thereon;
substantially perpendicularly aligning a laser emitter with the target surface, the laser emitter having an adjustable pulse time and an adjustable power output, and wherein the laser emitter is mechanically coupled onto an actuator assembly including a first member extending radially with respect to a centerline axis of the rotor and a second member extending axially in parallel with the centerline axis of the rotor, such that a position of the laser emitter relative to the blade structure is adjustable along an axial direction of the rotor or a radial direction from the rotor;
detecting the position of the laser emitter relative to the blade structure via a positional encoder mounted on the laser emitter; and
pulsing the laser emitter during the rotating of the blade structure about the rotor, while maintaining the laser emitter in a fixed position, to sublimate the contaminant from the target surface of the blade structure.

7. The surface treatment method of claim 6, wherein substantially perpendicularly aligning the laser emitter with the target surface includes adjusting a radial displacement between the laser emitter and the rotor before pulsing the laser emitter.

8. The surface treatment method of claim 6, further comprising adjusting an axial displacement between the laser emitter and the blade structure before pulsing the laser emitter.

9. The surface treatment method of claim 6, wherein, during the pulsing, a maximum energy output from the laser emitter is approximately one-hundred millijoules (mJ) and a maximum pulse time of the laser emitter is approximately fifty nanoseconds (ns).

10. The surface treatment method of claim 6, wherein the blade structure comprises a compressor blade, and wherein the target surface comprises a leading edge surface of the compressor blade.

11. The surface treatment method of claim 6, wherein the contaminant comprises one of an inorganic compound or an oxide compound.

12. A surface treatment system comprising:
a rotor having a plurality of blade structures mounted thereon;
a laser emitter configured for substantial perpendicular alignment with a target surface of each of the plurality of blade structures, the laser emitter having an adjustable pulse time and an adjustable power output;
a positional encoder in communication with the controller, mounted on the laser assembly, and configured to detect a rotational position of the blade structure relative to the laser assembly;
an actuator assembly mechanically coupled to the laser emitter and configured to move the laser emitter relative to the rotor, the actuator assembly including:
a primary actuator member including a first member extending radially with respect to a centerline axis of the rotor, and configured to radially adjust a position of the laser emitter,
a secondary actuator member including a second member extending axially in parallel with a centerline axis of the rotor, and configured to axially adjust the position of the laser emitter; and
a controller communicatively coupled to the rotor, the actuator assembly, and the laser emitter, the controller being configured to perform actions including:
rotating the plurality of blade structures using the rotor,
adjust the position of the laser assembly using the actuator assembly,
detect the position of the laser assembly and the rotational position of the blade structure via the positional encoder of the laser assembly, and
pulsing the laser emitter during the rotating of the plurality of blade structures, with the laser assembly in a fixed position, to sublimate a contaminant from the target surface of each of the plurality of blade structures.

13. The surface treatment system of claim 12, wherein a maximum energy output from the laser emitter is approximately one-hundred millijoules (mJ), and wherein a maximum pulse time of the laser emitter is approximately fifty nanoseconds (ns).

14. The surface treatment system of claim 12, wherein each of the plurality of blade structures comprises a compressor blade, and wherein the target surface of each compressor blade comprises a leading edge surface thereof.

15. The surface treatment system of claim 14, wherein the laser emitter is positioned within a compressor inlet having the plurality of blade structures therein.

16. The surface treatment system of claim 12, wherein the contaminant comprises one of a rust deposit, a dust deposit, or a congealed oil.

17. The surface treatment system of claim 12, wherein the controller is further configured to adjust the energy output and the pulse time of the laser emitter to sublimate the contaminant without modifying a material composition of the target surface of each of the plurality of blade structures.

18. The surface treatment tool of claim 1, wherein the controller is further configured to adjust the energy output and the pulse time of the laser emitter to sublimate the contaminant without modifying a material composition of the target surface of the blade structure.

19. The surface treatment system of claim 12, wherein substantially perpendicularly aligning the laser emitter with the target surface includes adjusting a radial displacement between the laser emitter and the rotor before pulsing the laser emitter.

\* \* \* \* \*